United States Patent [19]
Ayres

[11] 3,746,043
[45] July 17, 1973

[54] FLUID CONNECTION APPARATUS INCORPORATING CONTROL VALVE

[76] Inventor: David B. Ayres, 4633 W. M12, Quartz Hill, Calif. 93534

[22] Filed: Aug. 26, 1971

[21] Appl. No.: 175,301

[52] U.S. Cl. .......................................... 137/614.04
[51] Int. Cl. ........................ F16l 29/00, F16l 37/28
[58] Field of Search ...................... 137/614, 614.02, 137/614.03, 614.04

[56] References Cited
UNITED STATES PATENTS

| R23,365 | 5/1951 | Stranberg | 137/614.04 |
| 2,689,138 | 9/1954 | Scheiwer | 137/614.03 |
| 2,837,352 | 6/1958 | Wurzburger | 137/614.03 X |
| 3,196,897 | 7/1965 | Hodson | 137/614.04 X |
| 3,417,781 | 12/1968 | Gregg | 137/614.04 |

FOREIGN PATENTS OR APPLICATIONS

| 1,345,304 | 10/1963 | France | 137/614.04 |
| 979,821 | 1/1965 | Great Britain | 137/614.04 |

*Primary Examiner*—Martin P. Schwadron
*Assistant Examiner*—David J. Zobkiw
*Attorney*—Nilsson, Robbins, Wills & Berliner

[57] ABSTRACT

A fluid coupling apparatus is disclosed, as to include mating male and female members. Valve means affixed in both the male nozzle and the female receptacle close the passage through the connection apparatus until a mating engagement is established. A valve actuator apparatus is locked to prevent movement of the valves until the members are sealed together, after which, the actuator member may open and close the valve means. In the disclosed embodiment, a locking or mechanical coupling member of the nozzle along with the valve actuator and a fluid sealing member comprise three concentric tubular elements in a controlled-sequence structure with a valve poppet concentrically mounted therein.

7 Claims, 5 Drawing Figures

PATENTED JUL 17 1973
3,746,043
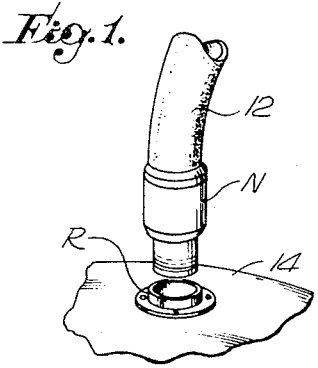
Fig. 1.
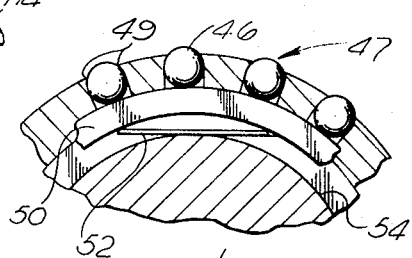
Fig. 5.
Fig. 4.
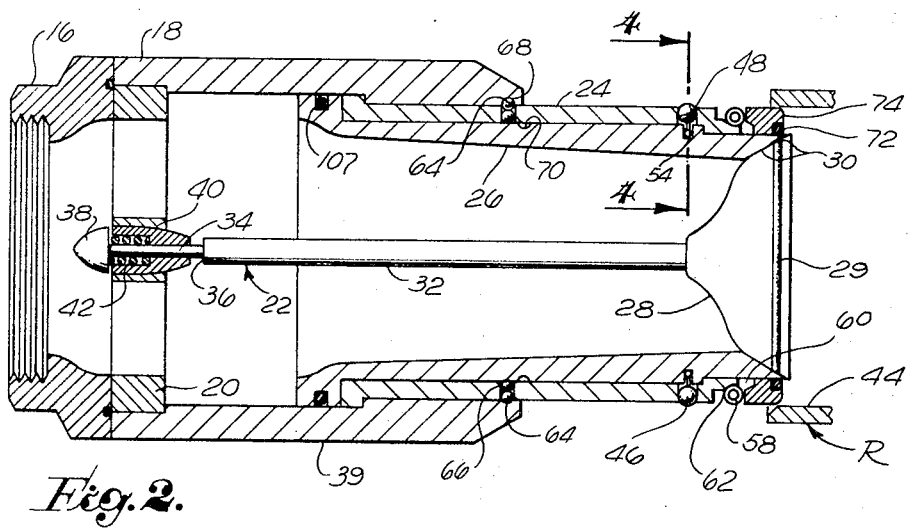
Fig. 2.
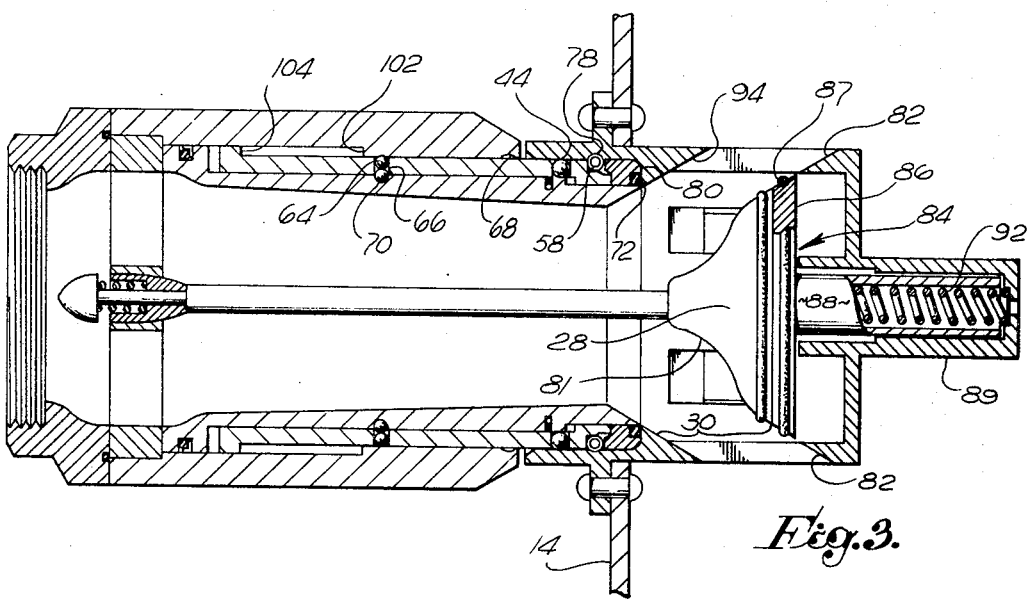
Fig. 3.

FLUID CONNECTION APPARATUS INCORPORATING CONTROL VALVE

BACKGROUND AND SUMMARY OF THE INVENTION

The need frequently arises for establishing a temporary fluid-flow coupling between two chambers. In some situations, the pressure in each of the chambers differs substantially from ambient pressure and any loss of such pressure is undesirable. Specifically, for example, one of the chambers may take the form of a relatively small tank containing fluid in both a liquid and a gaseous phase, under substantial pressure. The other chamber may comprise a supply tank from which the smaller tank is to be refilled, the supply tank also containing fluid, e.g. liquid at a substantial pressure. The problem arises in providing a coupling between the two tanks, as during a refilling operation. In many situations, loss of any substantial fluid from either tank is intolerable. For example, the fluid may be either dangerous or valuable; or complete closure may be important with regard to avoiding any loss of fluid resulting in a loss of pressure. Accordingly, a substantial need exists for an economical, fast, effective and durable coupling apparatus for temporary engagement to provide a fluid-flow interconnection, which apparatus may be joined and separated without exposing the interior of the coupling apparatus to ambient pressure. Ease of operation, and simplicity are also important desirable characteristics.

In general, the present invention incorporates a dispensing structure or nozzle which matingly engages a receptacle to provide a fluid-flow passage therethrough. The nozzle and receptacle each incorporate a valve which is maintained closed until the nozzle is sealingly engaged to the receptacle. Somewhat similarly, the valves are closed prior to disengaging the nozzle from the receptacle. The sequence inherent in such operations is provided by a telescopically mated three-element concentric structure.

BRIEF DESCRIPTION OF THE DRAWING

In the drawing, which constitutes a part of this specification, an exemplary embodiment exhibiting various objectives and features hereof is set forth, specifically:

FIG. 1 is a perspective view illustrative of a structure in accordance herewith;

FIG. 2 is a fragmentary sectional view taken centrally through the elements of FIG. 1 in a disengaged configuration;

FIG. 3 is a view similar to FIG. 2; however, showing both the elements of FIG. 1 in an engaged configuration;

FIG. 4 is a fragmentary sectional view of a portion of the structure of FIG. 2; and FIG. 5 is a fragmentary sectional view of another portion of the structure of FIG. 2.

DESCRIPTION OF THE ILLUSTRATIVE EMBODIMENT

As required, a detailed illustrative embodiment of the invention is disclosed herein. The embodiment exemplifies the invention which may, of course, be embodied in other forms, some of which may be radically different from the illustrative embodiment. However, the specific structural and functional details disclosed herein are representative, and they provide a basis for the claims herein which define the scope of the invention.

Referring now to FIG. 1, there is shown a nozzle N somewhat aligned with a receptacle R. The nozzle N is connected to a hose 12 while the receptacle R is affixed in a body 14. Of course, in different applications the nozzle N and the receptacle R may be variously utilized; however, as depicted in FIG. 1, the nozzle N is connected through the hose 12 to a source (not shown) of fluid under pressure while the receptacle R is connected to a tank or chamber (not shown) in the body 14, which tank also contains fluid under pressure.

In the operation of the structure hereof, a coupling between the nozzle N and the receptacle R is accomplished simply by forcing the nozzle into the receptacle. The fact that the nozzle N need not be turned, twisted or otherwise actuated is an important consideration. Withdrawal of the nozzle N from the receptacle R is accomplished by the similarly simple operation of forcefully drawing the nozzle N from the receptacle R. During both the insertion and withdrawal operations, neither the hose 12 nor the tank in the body 14 is exposed to ambient pressures. Accordingly, elevated pressures contained by the nozzle N and the receptacle R continued to be contained during coupling and uncoupling operations.

Considering the structure in greater detail, reference will now be made to FIG. 2 which primarily shows a central-axis sectional view through the nozzle N. A coupling on the hose 12 (FIG. 1) is threadably received in an end block 16 (right, FIG. 2) which is rigidly affixed to an actuating cylinder 18. The cylinder 18 carries a rigid web or apertured plate 20 in fixed relationship to the block 16, with the plate 20 which supports a valve poppet mechanism 22 concentrically within the cylinder 18.

The cylinder 18 comprises the external force-receiving member of the nozzle N and telescopically recieves a sliding mechanical coupling 24 which similarly receives a cylindrical, internally tapered seal and valve body 26. Thus, the cylinder 18, the coupling 24 and the body 26 each comprise annular or cylindrical members in concentric, telescopic relationship. As described in detail below, the internal body 26 functions to close the nozzle N with the receptacle R to accomplish a sealing relationship therewith. The external cylinder 18 receives the insertion forces as may be variously applied manually or otherwise, which are sequenced by operation of the mechanical coupling 24 to initially seal the body 26 to the receptacle and subsequently actuate the poppet mechanism 22 to open the nozzle.

When not in use to pass fluid, the nozzle N is sealed closed by the poppet mechanism 22. Specifically, a valve poppet 28 of circular configuration sealingly engages the body 26 along matingly engaged annular surfaces 30; the poppet carrying an O-ring 29. The poppet 28 centrally receives an elongated rod 32, coaxial with the body 26 and extending to terminate in a section 34 of reduced diameter to provide a shoulder 36. The section 34 receives a nut 38 by threaded engagement, fixing the section 34 in a thrust bearing 40 which is centrally positioned in the web 20. The bearing 40 also confines a coil spring 42 which engages the nut 38 and urges the poppet mechanism 22 to the left (as illustrated) holding the valve closure surfaces 30 firmly engaged with the O-ring 29 therebetween.

In view of the above somewhat-preliminary description of the nozzle structure, further understanding thereof may now best be pursued by considering the sequence of operation involved in mating the nozzle N to the receptacle R as fragmentarily shown in FIG. 2. For purposes of illustration, assume that the operation is to be performed manually by gripping the external surface 39 of the cylinder 18, aligning the nozzle N with the receptacle R (as illustrated) and forcing the nozzle N into the cylindrical chamber defined by the receptacle R.

The initial movement of the nozzle N into the receptacle R is unobstructed until the internal cylindrical wall 44 of the receptacle R engages a set of safety balls 46 which are held in radial bores by lips 49, in the coupling 24, which may also be considered a mechanical sequence switching mechanism. The balls 46 are urged outwardly to an enlarged radius by a plurality of lock ring segments 50 backed by leaf springs 52. The arcuate segments 50 extend in a groove 54 in the body 26 (FIG. 2) as well as the groove 48 when the safety balls 46 are in an extended position. Accordingly, with the segments 50 in such a position, the coupling cylinder 24 is locked to the valve body 26 preventing relative sliding movement therebetween. When the balls 46 are forced inwardly by engagement with the cylindrical wall 44 of the receptacle R, the leaf springs 52 and the ring segments 50 are compressed into the internal groove 54 permitting the cylindrical coupling 24 to slide with reference to the body 26. Thus, the safety balls 46 operate to prevent operation of the nozzle N preliminarily until the nozzle has been inserted in a mating receptacle R.

As the nozzle N is moved into further engagement with the receptacle R, a spring lock 58 comprising a compressing coil spring looped to dwell in an annular groove 60, locks the nozzle to the receptacle. Specifically, as disclosed in detail below, the spring lock 58 is forced outwardly by receiving an annular cam surface 62 of enlarged diameter defined on the coupling 24 and is thereby forced into an annular groove in the receptacle R as described below. Accordingly, the looped spring lock 58 firmly engages the coupling 24 to the receptacle R.

The initial movement to position the surface 62 under the spring lock 58 is imparted to the coupling 24 from the cylinder 18 through plural sets of sequence balls 64. Each pair of balls 64 is received in a radially extending bore 66 (in coupling 24) from which the balls may fall into either an annular groove 68 (defined in the interior of the cylinder 18) or an external groove 70 (defined in the body 26).

The initial movement of the cylinder 18 is applied to the coupling 24 as the balls 64 are received in the groove 68. However, when the coupling 24 is locked to the receptacle R, the balls 64 are displaced, into the groove 70, lockingly engaging the coupling 24 to the body 26. Accordingly, the cylinder 18 is free to slide telescopically over the coupling 24 and the body 26. It is to be noted that this sliding relationship is permitted only after the spring loop lock 58 has locked the body 26 into sealing engagement with the receptacle R. Specifically, an O-ring 72 carried in the flat end 74 of the body 26 matingly engages an opposed facing surface defined in the receptacle R as considered in detail below.

With the body 26 matingly engaged in sealing relationship with the receptacle R, the valve poppet 28 may be opened to permit fluid flow through the nozzle N. Accordingly, as the external cylinder 18 slides to receive the coupling 24 (along with the body 26) the web 20 forces the poppet mechanism 22 out of the body 26, separating the surfaces 30 and opening the internal valve. Thus, fluid flow occurs around the poppet mechanism 22 through the block 16 and the hose 12. It is noteworthy that the direction of such fluid flow is entirely immaterial.

The configuration of the elements of the nozzle N upon engagement with the receptacle R is shown in FIG. 3 and will now be considered. Note initially that the spring lock 58 is matingly received in an annular groove 78 defined in the wall 44 of the receptacle. Also, in the locked position, the O-ring 72 is in sealing engagement with a radial shoulder 80 defined in the receptacle R.

The flow path from the nozzle N is somewhat radial in passing through the receptacle R and in that regard, the surface 81 of the poppet 28 is somewhat conical. Specifically, fluid flow between the annular surfaces 30 is through radial ports 82 defined in the receptacle R. Such a flow pattern enables a coaxial valve structure 84, serving to close the receptacle R when not engaged with the nozzle N. Specifically, a poppet 86 in the form of a beveled disk carrying an O-ring 87, is supported on a tubular shaft 88 which is telescopically received in a cylindrical housing 89 concentrically affixed in the receptacle R. A coil spring 92 is positioned within the tubular shaft 88 urging the affixed poppet 86 to the left (as shown) to engagement with a beveled, annular surface 94 defined inside the receptacle R. The poppet 86 is engaged directly by the poppet 28 and urged to the right to be opened concurrently with the opening of the nozzle valve when the poppet 28 moves to the right.

The withdrawal and disengagement of the nozzle N from the receptacle R is accomplished simply by forceful withdrawal. Specifically, the cylinder 18 is urged to the right (as depicted) by hand, for example, forcing the rigidly coupled valve mechanism 22 to the left, closing the mating surfaces 30 between the poppet 28 and the body 26. Concurrently, the poppet 86 is permitted to close against mating surface 94. Thus, the valve elements in both the nozzle N and the receptacle R are closed.

As the cylinder 18 is drawn to the end of its stroke, an internally defined shoulder 102 in the cylinder abuttingly engages an external shoulder 104 on the coupling 24. This engagement occurs in coincidence with alignment of the internal groove 68 with the bores 66 containing the sequence balls 64. Accordingly, the force applied to the cylinder 18 moves the balls from the groove 70, disengaging the coupling 24 from the body 26 so that further motion of the cylinder 18 is imparted to the coupling 24. Accordingly, the coupling 24 is withdrawn from the receptacle R pulling the cam surface 62 out of the spring loop lock 58 to disengage the lock from the groove 78. Accordingly, the nozzle N is disengaged from the receptacle R and may be removed without further resistance.

It is to be understood that a wide variety of different seals, individual coupling arrangements and locking members may be employed in accordance herewith. For example, a seal 107 (in addition to those described above) is provided between the cylinder 18 and the body 26, adjacent the block 16. An annular groove 110 in the body 26 receives an O-ring 112 (FIG. 5) along with a pressure or rub ring 114 having an L-shaped cross section. The O-ring comprises a resiliently deformable material, e.g. rubberlike, as widely used in prior art structures. The pressure ring 114 defining essentially a corner may be formed of Teflon, nylon or various other materials and has a seal-engaging surface 116 which does not fully close the groove 110. Consequently, pressure developed within the groove 110 distorts the O-ring 112 urging the surface 116 of the ring 114 into firm engagement with the internal surface of the cylinder 18. The structure has advantages of an effective, durable seal and also in that the ring 114 may be substantially flattened so as to slide over the shoulders of the groove 110.

The coupling apparatus may be variously produced of various materials; however, conventional metalworking techniques are satisfactory. For example, the various elements are available or may be machined. The cylinder 18 is affixed to the block 16 and the web 20 as by welding or other techniques. The sealing body 26 may be formed in two parts (with the flange end 74 separate) joined by shrink-fit methods. Otherwise, conventional assembly methods as widely practiced may be employed to complete the apparatus. The garter or spring ring lock 58 may alternately comprise a series of balls interconnected by a resilient line.

Generally, the significance of the structure is deemed to reside in an annular unit, requiring no longitudinal alignment between elements and incorporating the alternate coupling or sequencing structure to provide mechanical switching operations to apply insertion forces to initially seal the apparatus, then open the valve mechanism.

Of course, various other structures may be employed along with various other components for the system in general. Accordingly, the system is defined in scope by the following claims.

What is claimed is:

1. An apparatus for use as on a fluid duct for connecting the fluid duct to a fluid receptacle member, comprising:
   a sealing member structure adapted to be affixed to said fluid duct and for engaging said fluid receptacle member in sealing relationship;
   a valve means affixed in said sealing member structure for closing said fluid duct, said valve means being movable in relationship to said sealing member structure;
   a valve actuator means mounted in movable relationship with said sealing member structure for locking said valve means closed; and
   sequencing means for controlling said valve actuator means to unlock, open and close said valve means by sensing a predetermined positional relationship between said sealing member structure and said fluid receptacle member.

2. An apparatus according to claim 1 wherein said sequencing means includes an annular member concentrically positioned between said valve actuator means and said sealing member structure.

3. An apparatus according to claim 2 wherein said sequencing means further includes a safety lock means comprising a plurality of detent structures for depression upon insertion of said apparatus in said fluid receptacle member.

4. An apparatus according to claim 3 wherein said sealing member structure is annular and further includes annular spring means positioned to be received in said fluid receptacle member and means for expanding said spring means upon insertion of said apparatus into said fluid receptacle member.

5. An apparatus as defined by claim 2 and further including said fluid receptacle member in combination therewith, and wherein said fluid receptacle member includes receptacle valve means actuated by said valve acutator means.

6. An apparatus according to claim 5 wherein said receptacle valve means is actuated by direct engagement with said valve means in said apparatus.

7. An apparatus according to claim 1 wherein said valve actuator means includes plural pairs of detent structures.

* * * * *